United States Patent [19]

Holzwarth

[11] 4,303,116
[45] Dec. 1, 1981

[54] TIRE CHAIN

[76] Inventor: Dietmar H. Holzwarth, Vogelhofstrasse 51, Schwäbisch Gmünd, Fed. Rep. of Germany, 7070

[21] Appl. No.: 84,584

[22] Filed: Oct. 15, 1979

[30] Foreign Application Priority Data

Oct. 26, 1978 [DE] Fed. Rep. of Germany ....... 2846907

[51] Int. Cl.³ ............................................ B60C 27/00
[52] U.S. Cl. ................ 152/224; 152/225 R; 152/241
[58] Field of Search ............... 152/224, 217, 223, 218, 152/225 R, 219, 239–242, 243, 245

[56] References Cited

U.S. PATENT DOCUMENTS

| 991,013 | 5/1911 | Ohlsson | 152/224 |
| 1,419,680 | 6/1922 | Maguire | 152/224 X |
| 1,922,106 | 8/1933 | McKay | 152/224 X |
| 2,259,189 | 10/1941 | Williams et al. | 152/224 |

FOREIGN PATENT DOCUMENTS 657612  3/1938  Fed. Rep. of Germany ...... 152/224

Primary Examiner—John E. Kittle
Assistant Examiner—Thomas Bokan
Attorney, Agent, or Firm—Parmelee, Johnson, Bollinger & Bramblett

[57] ABSTRACT

In a tire chain comprising a running network (3) with steel links between chain strand portions of the running network and the tread of the tire supporting members (4) provided with guide hollows (5) are disposed. By varying the state of at least one lateral retaining strand (1 or 2) of the running network (3) it is possible for the purpose of varying the operating behavior of the tire chain to vary the position of the supported chain strands transversely to the guide hollows (5) in a way that enables the chain strands to project more or less over the outer surfaces of the supporting members (4).

12 Claims, 10 Drawing Figures

TIRE CHAIN

The invention relates to a tyre chain, more particularly a skid protection chain, comprising a running network with steel links which is held by lateral retaining strands of which at least one is adapted to be tensioned, and comrising non-metallic supporting members which are disposed between chain strand portions of the running network and the tread of the tyre and which have supporting surfaces, provided with guide hollows, for the running network parts supported on the supporting members.

From DE-PS No. 657,612 is known a skid protection chain in the form of a tyre chain of the above described type, in which two lateral chains are joined together by rubber supporting members. The supporting members, which are provided with a groove extending transversely to the tyre tread, serve in this chain as cleats. In order to increase the grip of the cleats it is possible for a transverse chain, the ends of which are suspended in the lateral chains, to be inserted into the groove. It is obvious that the conversion of the known chain from operation with cleats alone to operation with cleats and transverse chains is extremely laborious, while the storage of the detached transverse chains during operations with cleats alone gives rise to problems.

It is the object of the invention to provide a tyre chain of the type referred to, in which by varying the tension of at least one lateral retaining strand the extent to which the steel links of the supported running network parts project out of the guide hollows can be varied.

According to the invention this object is achieved in that for the purpose of varying the operating behaviour of the tyre chain the running network parts supported by the supporting members can vary their position transversely to the guide hollows of the supporting members in dependence on the state of tension of the tensionable lateral retaining strand.

The tyre chain according to the invention provides the advantage that in it the deep parts of the guide hollows form so-to-speak a protective zone for the chain strand portions of the running network, to which zone the chain strand portions can be transferred by increasing the tension of the lateral retaining strands as soon as the vehicle passes for example from a snow-covered roadway to a roadway free from snow, as may occur in particular in mountain regions. Owing to the fact that when running on a dry roadway the supporting members are firmly pressed against the tread by the running network parts supporting them, relative movements between the supporting members and the tyre are prevented. Disturbing frictional wear, such as could occur in particular when the supporting members are made of rubber, is eliminated. In the loosened state, that is to say on a wet, snow-covered road, disturbing frictional wear also need not be feared, since the snow acts as lubricant.

BRIEF DESCRIPTION OF THE DRAWINGS

Further details and features of the invention will be seen from the claims and from the description given below of a number of embodiments illustrated as examples in the accompanying drawings, in which:

In FIG. 1, 1 and 2 are two retaining strands which are formed by lateral chains and to which a running network 3 is joined. The portions of the running network which are situated in the region of the tyre tread extend over X-shaped supporting members 4, which are joined loosely to the running network and are provided with guide hollows 5. At the ends of the supporting members are situated passage apertures 6, the inside width of which is on the one hand slightly greater than the outside width of the oval links 7 supported on the supporting members 4, and on the other hand smaller than the outside width of an annular link 8 disposed horizontally and forming a nodal point. The X-shaped configuration of the supporting members 4 prevents undesirable tilting movements.

FIG. 2 shows a construction comprising substantially Z-shaped supporting members 9. The tensioning strands 1 and 2 here consist of lengths of wire rope. Parts of the running network 3 are also in the form of wire rope. In the middle region of the tread, however, lengths of chain are used here also.

FIG. 3 shows a supporting member 10 provided with a guide hollow 5 which in the region of its base has recesses 11. These recesses engage the bottom portions of oval links 7. The guide hollow 5 of the supporting member 10 is comparatively deep. An arrangement of the kind illustrated is used in particular when the elasticity of the material of the supporting member is great.

FIGS. 4 to 6 show cross-sections through a supporting member 12 having a bowl-shaped guide hollow 13. In FIG. 4 the chain 14 assumes a position in which it projects only slightly or not at all from the guide hollow 13. If the retaining strands are slackened, the chain 14 can travel sideways, as indicated in FIGS. 5 and 6, and in this way increase the grip of the tyre chain.

Whereas in the embodiment illustrated in FIGS. 4 to 6 use is made of a guide hollow 13 the depth of which decreases towards the sides from a value which corresponds approximately to the outside width of the links of the chain 14, FIGS. 7 and 8 show a supporting member 15 having a guide hollow 16 the depth of which decreases stepwise towards the sides from a value which corresponds approximately to the outside width of the links of the chain 14. In FIG. 7 the chain 14 is strongly tensioned, while in FIG. 8 it is slacker.

Finally, FIGS. 9 and 10 show a supporting member 17 provided with a guide hollow 18 with, on both sides, adjoining supporting surfaces 19 for the chain 14. In this case the guide hollow has a depth which is at least equal to half the outside width of the links of the running network part supported by it.

Figure 1:
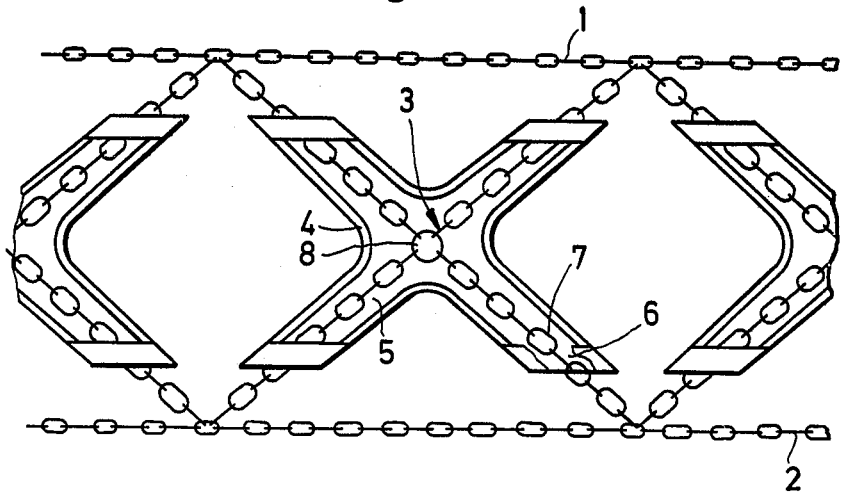
FIG. 1 is a plan view of part of a spread-out tyre chain having X-shaped supporting members.
Figure 2:
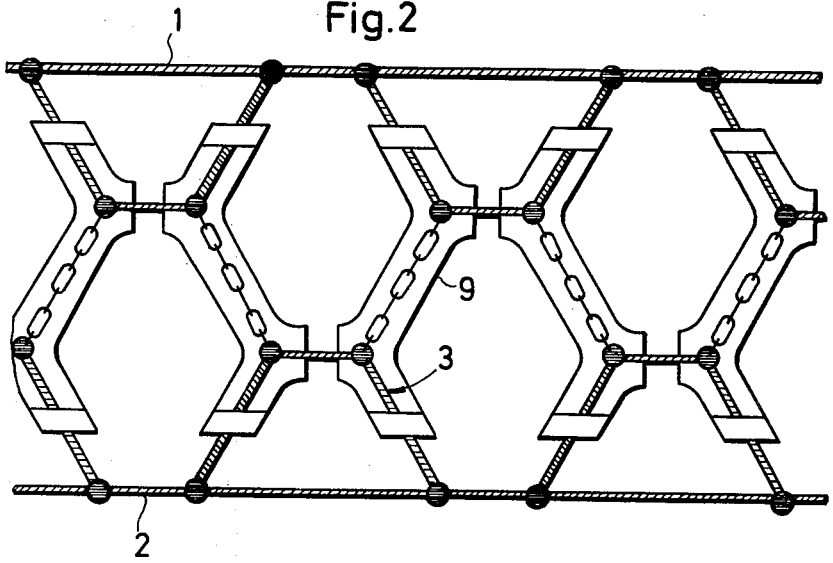
FIG. 2 a plan view of a part of a spread-out tyre chain having Z-shaped supporting members.
Figure 3:
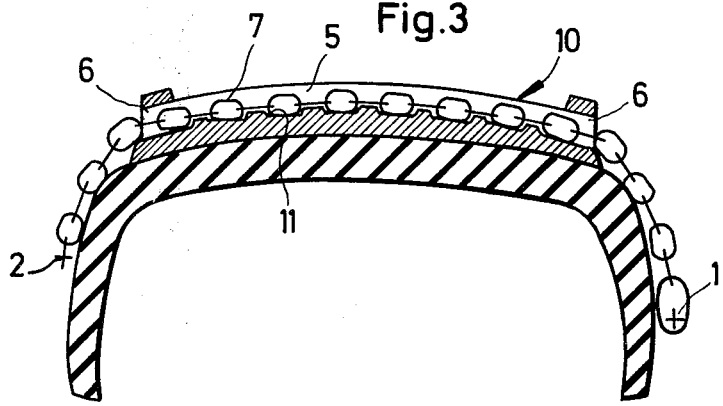
FIG. 3 is a section through a supporting member supporting a chain strand.
Figure 4:
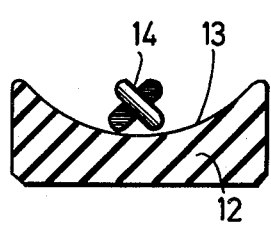
FIGS. 4 to 6 are sections through a supporting member having a bowl-shaped guide hollow, the height of which decreases continuously towards the sides.
Figure 5:
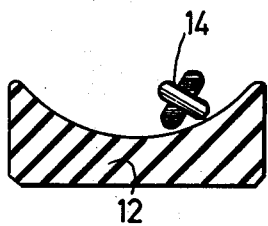
Figure 6:
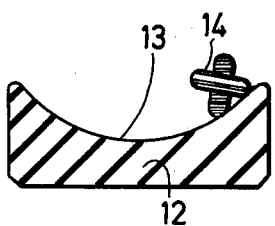
Figure 7:
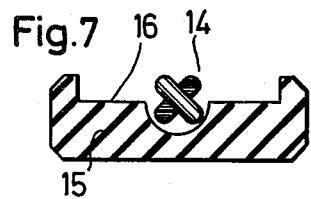
FIGS. 7 and 8 each show a section through a bowl-shaped guide hollow the height of which decreases stepwise from the center towards the sides.
Figure 8:
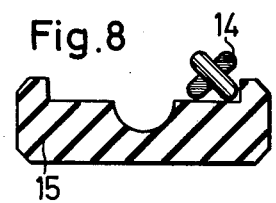
Figure 9:
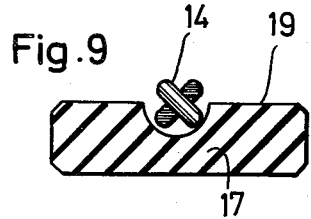
FIGS. 9 and 10 are sections through another supporting member.
Figure 10:
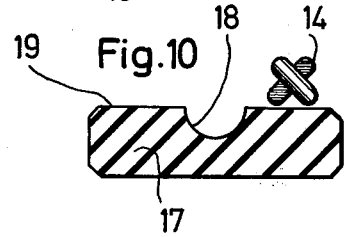

What is claimed is:

1. A tyre chain, more particularly a skid protection chain, comprising a running network with steel links which is held by lateral retaining strands of which at least one is adapted to be tensioned, and comprising non-metallic supporting members which are disposed between chain strand portions of the running network and the tread of the tyre and which have supporting surfaces, provided with guide hollows, for the running network parts supported on the supporting members, characterized in that:

- at the ends of the guide hollows (5,13,16,18) the supporting members (4,9,10,12,15,17) are provided with apertures (6) forming passages for running network portions,
- means for adjusting the tension of said at least one lateral retaining strand (1,2) for varying the extent to which the steel links of the supported running network parts project out of the guide hollows in said supporting members,
- at least parts of said guide hollows being orientated in a slanting direction relative to said lateral retaining strands due to the ground plan of said supporting members for preventing tilting movements of said supporting members.

2. A tyre chain according to claim 1, characterized in that it has supporting members (4) having a substantially X-shaped ground plan.

3. A tyre chain according to claim 1, characterized in that it has supporting members (9) having a substantially Z-shaped ground plan.

4. A tyre chain according to claim 2, characterized in that the passage apertures (6) have an inside width which on the one hand is at least equal to the outside width of oval links (7) supported on the supporting members (4,) and on the other hand is smaller than the outside width of in each case at least one horizontal annular link (8) disposed between two passage apertures and forming a nodal point with vertical oval links.

5. A tyre chain according to claim 1, characterized in that the depth of the guide hollows (5,13,16) decreases from the center towards the sides and that the running network parts supported by the supporting members (4,9,10,12,15,17) can vary their position transversely to the guide hollows (5,13,16,18) of the supporting members (4,9,10,12,15,17).

6. A tyre chain according to claim 5, characterized in that the depth of the guide hollows (13) decreases continuously towards the sides.

7. A tyre chain according to claim 5, characterized in that the depth of the guide hollows (16) decreases stepwise towards the sides.

8. A tyre chain according to claim 1, characterized in that the supporting surfaces (19) for running network parts are provided on both sides of the guide hollow (18).

9. A tyre chain according to claim 1, characterized in that the guide hollows (5) for the running network parts comprising chain links are provided with recesses (11) adapted to the shape of the chain links.

10. A tyre chain according to claims 1 or 9, characterized in that the greatest depth of the guide hollows (18) is at least equal to half the outside width of the links of the running networks parts (14) supported by them.

11. A tyre chain according to claim 1, characterized in that the greatest width of the guide hollows (5,13,16) is substantially equal to the outside width of the links of the running networks parts (14) supported by them.

12. A tyre chain according to claim 1, characterized in that the supporting members (4,9,12,15,17) are made of a flexible material.

* * * * *